United States Patent [19]

Torazawa et al.

[11] Patent Number: 5,363,364
[45] Date of Patent: Nov. 8, 1994

[54] AUDIO DATA RECORDING/REPRODUCING APPARATUS HAVING DIGITAL HIGH-SPEED DUBBING FUNCTION

[75] Inventors: Kenji Torazawa; Yasuhiro Ishii; Tateo Toyama; Shin'ichiro Tomisawa; Nagatoshi Sugihara, all of Gifu, Japan

[73] Assignee: Sanyo Electric Co., Ltd., Osaka, Japan

[21] Appl. No.: 876,365

[22] Filed: Apr. 30, 1992

[30] Foreign Application Priority Data

May 7, 1991 [JP] Japan .................. 3-101518

[51] Int. Cl.$^5$ ..................... G11B 5/02; G11B 27/02
[52] U.S. Cl. ..................... 369/124; 369/13; 360/13; 360/15; 360/32; 360/55
[58] Field of Search ............. 369/124, 284, 13; 360/8, 84, 15, 32, 48, 55, 19.1, 33.1, 51

[56] References Cited

U.S. PATENT DOCUMENTS

| | | | |
|---|---|---|---|
| 4,468,710 | 8/1984 | Hashimoto et al. | 360/33.1 |
| 4,754,483 | 6/1988 | Weaver | 360/51 |
| 4,758,899 | 7/1988 | Tsukiyama | 360/8 |
| 4,825,305 | 4/1989 | Itoh et al. | 360/8 |
| 4,912,570 | 3/1990 | Kinoshita et al. | 360/8 |
| 5,155,636 | 10/1992 | Odaka | 360/32 |
| 5,197,101 | 3/1993 | Mok | 360/8 |
| 5,224,087 | 6/1993 | Maeda et al. | 369/124 |
| 5,270,828 | 12/1993 | Mogi | 360/32 |
| 5,311,370 | 5/1994 | Takayama | 360/31 |

FOREIGN PATENT DOCUMENTS

| | | |
|---|---|---|
| 473305 | 8/1991 | European Pat. Off. |
| 62-202332 | 9/1987 | Japan |
| 3119568 | 5/1991 | Japan |
| 3254466 | 11/1991 | Japan |

OTHER PUBLICATIONS

Murata et al., "Multimedia Type Digital Audio Disc System", *IEEE Transaction Consumer Electronics.*, vol. 35, No. 3, Aug. 1989, pp. 544-551.
Torazawa et al., "Erasable digital audio disk system", *Applied Optics*, vol. 25, No. 22, 15 Nov. 1986, pp. 3990-3995.

*Primary Examiner*—Paul M. Dzierzynski
*Assistant Examiner*—Kim-Kwok Chu
*Attorney, Agent, or Firm*—Peter L. Michaelson

[57] ABSTRACT

A disc recording/reproducing apparatus according to the present invention intermittently records and reproduces compressed digital audio data in normal recording/reproduction. In high-speed dubbing of digital audio data, two of such apparatuses are used, wherein compressed digital audio data is continuously reproduced from a disc for reproduction by the reproduction side apparatus to be directly applied to the recording side apparatus and continuously recorded on a disc for recording. Thus, the compressed high-speed dubbing of the digital audio data can be achieved without increasing a rotation speed of the disc even in high-speed dubbing.

3 Claims, 4 Drawing Sheets

AUDIO DATA RECORDING/REPRODUCING APPARATUS HAVING DIGITAL HIGH-SPEED DUBBING FUNCTION

BACKGROUND OF THE INVENTION

1. Field of the Invention

The present invention relates generally to audio data recording/reproducing apparatuses, and more particularly, to an audio data recording/reproducing apparatus using a magneto-optical recording medium to perform digital high-speed dubbing of audio data.

2. Description of the Background Art

In conventional high-speed dubbing of an analog audio signal by two tape recorders, one tape recorder at the reproduction side reproduces an audio signal at a high speed from a tape on which the analog audio signal is recorded, while the other tape recorder at the recording side records a reproduced audio signal supplied by the reproduction side tape recorder on a tape travelling at the same speed as that of the tape of the reproduction side tape recorder. As described above, in case of the conventional tape recorder, high speed dubbing of the analog audio signal can be easily achieved without providing a special recording/reproduction mechanism or circuit.

On the other hand, high-speed dubbing of a digital audio signal involves such a problem as follows. More specifically, the case should be considered in which dubbing of a digital audio signal is performed, for example, a digital audio signal reproduced from a compact disc player (a signal of a so-called CD format) is applied to a digital audio recorder using optical recording or magneto-optical recording principle to perform dubbing of such signal on a disc at a high speed (e.g. four times as fast as normal speed). In such a case, satisfactory reproduction and recording of such a digital audio signal can not be achieved unless intensities of beams for reproduction and recording are increased to be several times (for example, four times) those of normal reproduction and recording at respective sides of reproduction and recording. Accordingly, there is a problem in providing a special recording/reproduction mechanism or circuit for digital high-speed-dubbing in respective disc recording/reproducing apparatuses for reproduction and for recording.

SUMMARY OF THE INVENTION

An object of the present invention is to provide an audio data recording/reproducing apparatuses capable of easily dubbing a digital audio signal at a high speed without providing a special signal recording/reproduction mechanism or circuit.

In short, the present invention relates to an audio data reproducing apparatus comprising a disc motor for rotating a disc on which a single continuous recording track is formed in a spiral manner wherein compressed digital audio data obtained by compressing recording audio data and having a reduced data amount is recorded with the time base thereof compressed at the fixed linear velocity, an intermittent reproduction circuit for intermittently reproducing the compressed digital audio data i.e., by reproducing data that is intermittently recorded upon a disc; from the recording track of the disc rotated by the disc motor at the fixed linear velocity, a memory for storing the compressed digital audio data reproduced by the intermittent reproduction circuit, a data expansion circuit for expanding the compressed digital audio data stored in the memory to form first reproduced audio data and outputting this reproduced audio data, and a continuous reproduction circuit for continuously reproducing the compressed digital audio data from the recording track of the disc rotated by the disc motor at the fixed linear velocity and continuously outputting the data as second reproduced audio data.

According to another aspect of the present invention, an audio data recording apparatus comprises a disc motor for rotating a disc at a fixed linear velocity, a data compression circuit for compressing supplied first digital audio data, a memory for sequentially storing the compressed digital audio data, an intermittent recording circuit for intermittently reading the compressed digital audio data stored in the memory and intermittently storing the compressed digital audio data on the disc rotated by the disc motor at the fixed linear velocity to form a single continuous recording track in a spiral manner and a continuous recording circuit for continuously recording second compressed digital audio data continuously supplied in place of the first digital audio data on the disc rotated by the disc motor at the fixed linear velocity to form a single continuous recording track in a spiral manner.

According to a further aspect of the present invention, an audio data recording/reproducing apparatus comprises a disc motor for rotating a disc at a fixed linear velocity in recording and reproduction, a data compression circuit for compressing supplied first digital audio data in recording, an intermittent recording circuit for intermittently recording the compressed digital audio data on the disc rotated by the disc motor at the fixed linear velocity to form a single continuous recording track in a spiral manner, a continuous recording circuit for continuously recording second compressed digital audio data continuously supplied in place of the first digital audio data on the disc rotated by the disc motor at the fixed linear velocity to form a single continuous recording track in a spiral manner, an intermittent reproduction circuit for intermittently reproducing the compressed digital audio data from the single continuous recording track formed on the disc rotated by the disc motor at the fixed linear velocity in reproduction, a data expansion circuit for expanding the compressed digital audio data reproduced intermittently to form first reproduced audio data, and a continuous reproduction circuit for continuously reproducing the compressed digital audio data from the single continuous recording track formed on the disc rotated by the disc motor at the fixed linear velocity and continuously outputting the data as second reproduced audio data.

Therefore, the main advantage of the present invention resides in the provision of means for continuously reading the compressed digital audio data intermittently recorded on a recording track of a disc and/or means for continuously recording the continuously supplied compressed digital audio data on the recording track of the disc, in an audio data recording/reproducing apparatus for intermittently recording the compressed digital audio data on a recording medium and/or reproducing the data therefrom, thereby enabling a high-speed dubbing of a digital audio signal with a simple structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
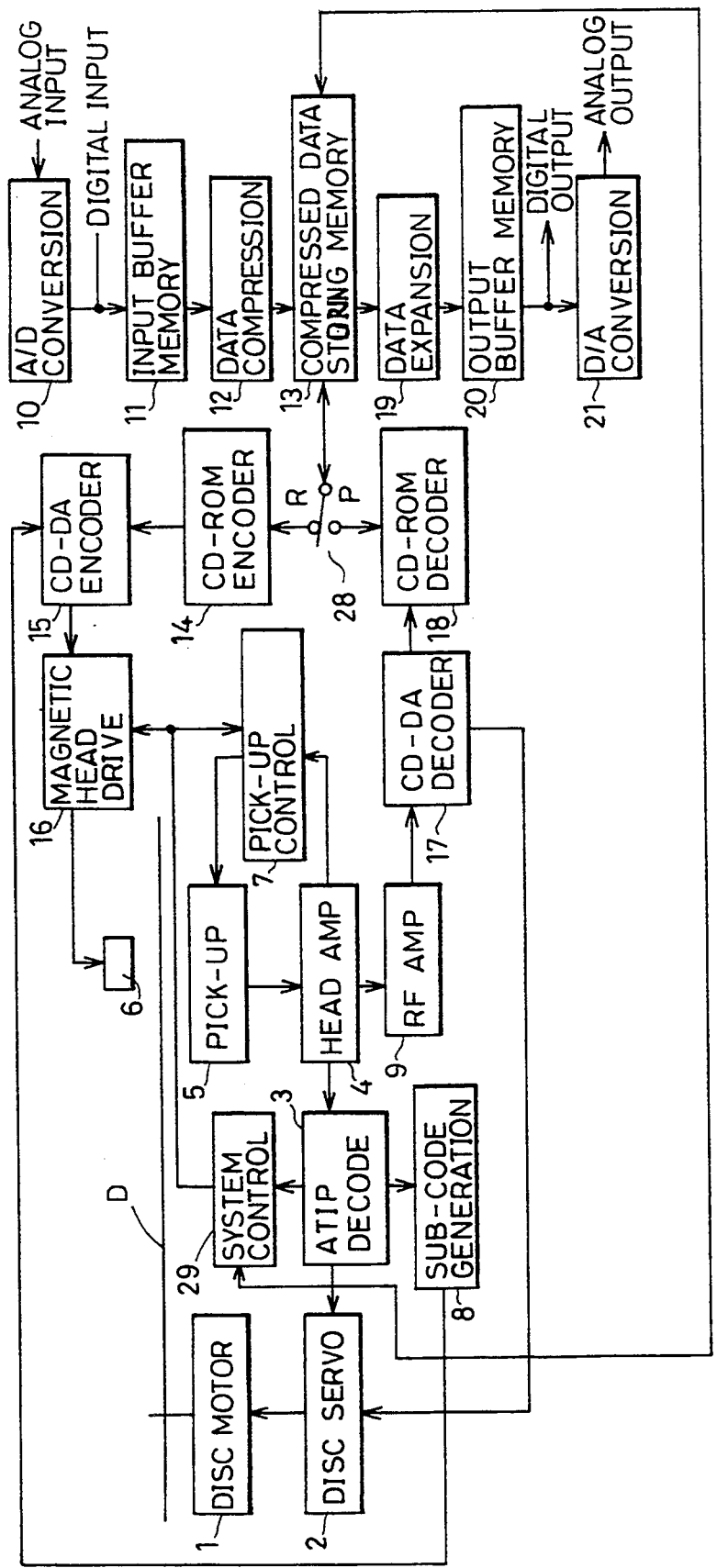
FIG. 1 is a schematic block diagram showing a disc intermittent recording/reproducing apparatus to which the present invention is applied.
Figure 2:
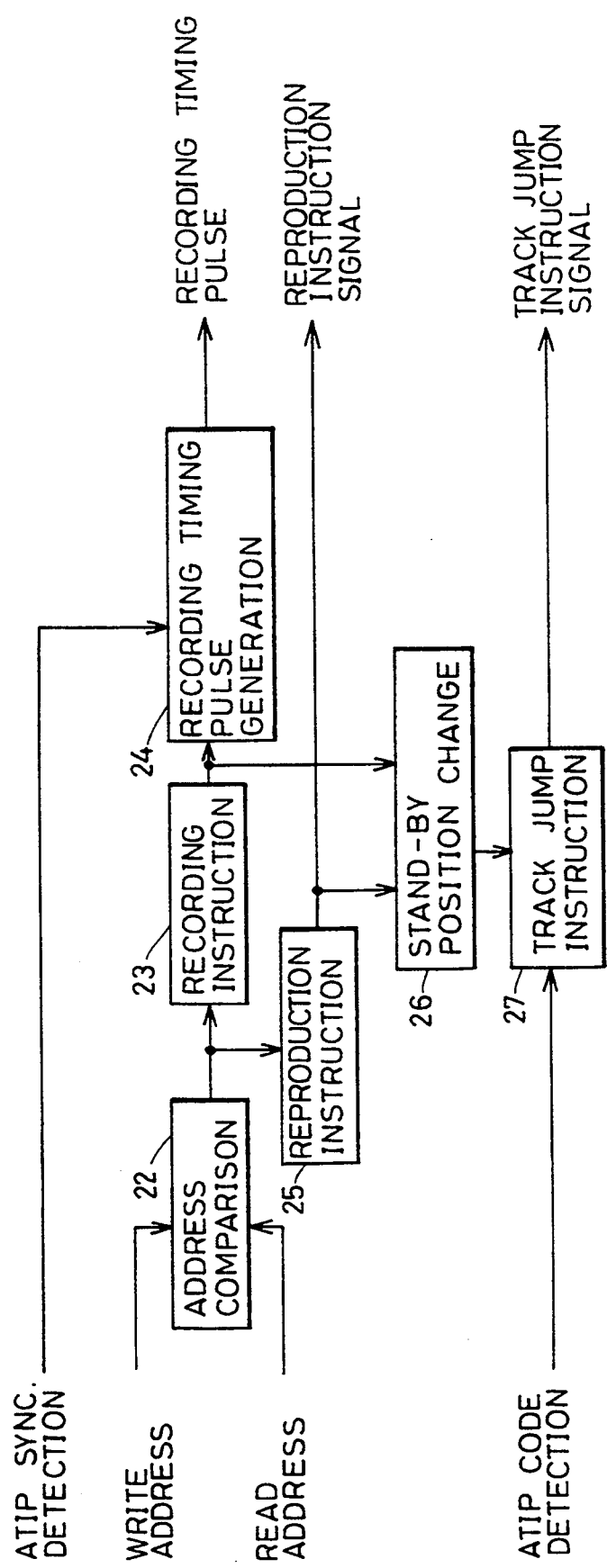
FIG. 2 is a block diagram showing a system control circuit in FIG. 1 in detail.

With reference to FIGS. 1 and 2, one example of a common disc intermittent recording/reproducing apparatus to which the present invention is applied will be described. FIG. 1 is a schematic block diagram showing the structure of a recording/reproducing apparatus for a small size disc as one example of such disc intermittent recording/reproducing apparatus. The small size disc has been proposed as a portable or car disc player. It is possible to record audio information on such disc by employing a magneto-optical recording principle, with a maximum recording capacity of 74 minutes of audio data on one side of the disc which is about 7 cm in diameter.

Briefly described, intermittent recording/reproduction of a digital audio signal by using the small size disc is carried out by thinning out (compressing data) a digital audio signal to 1/5, for example, to record the compressed signal on a disc based on the magneto-optical recording principle in recording, while expanding the data reproduced from the disc on the magneto-optical reproduction principle to be five-times to form a continuous digital audio signal in the same manner as the original signal in reproduction.

More specifically, during recording, data of a continuous digital audio signal corresponding to a period T (for example, 2 seconds) is compressed into 1/5 and the compressed data is recorded during T/5 period (0.4 seconds) as well as while a head for recording is in a stand-by state during the remaining 4T/5 period (1.6 seconds), processing is undertaken including checking whether the above recording has been properly performed.

In reproduction, the compressed audio signal is reproduced during T/5 period (0.4 seconds) and while a pick-up for reproduction is in a stand-by state during the remaining 4T/5 period (1.6 seconds), a processing for subsequent reproduction is performed. Then, the reproduced compressed audio data is expanded to be five times and output as a continuous audio signal during the subsequent period of T.

The above-described small size disc commonly employs the magneto-optical recording/reproduction principle for recording/reproduction of digital audio data. The magneto-optical recording/reproducing principal is described in detail in, for example, articles entitled "Multimedia Type Digital Audio Disc System" by S. Murata et al., IEEE Transactions on Consumer Electronics, Vol. 35, No. 3, August 1989 and "Erasable Digital Audio Disk System" by K. Torazawa et al., Applied Optics, Vol. 25, No. 22, 1986. In short, a magnetic layer of the disc is heated by a laser beam and the magnetic layer is magnetized in that state by a recording signal to hold information in the disc.

In addition, in the small size disc to which the present invention is applied, a single continuous guide groove is formed in a spiral manner in advance on the disc surface and an ATIP code (Absolute Time in Pregroove) indicative of an absolute position of the recording track is multiplexed in the guide groove in advance. The ATIP code, constituted by an absolute time and a frame number, is multiplexed for each frame.

The ATIP code is multiplexed into the guide groove in a manner as described in the following. That is, the ATIP code is frequency-modulated, with a frequency deviation range set to 22.05±1 KHz. The above-described guide groove is formed in a zigzag fashion in response to the modulated signal. Then, upon irradiation of thus formed guide groove with a laser beam, a modulated signal component is detected by a push-pull method as a tracking error signal, which signal is used as an index indicative of an absolute address of a recording track at the time of recording and reproducing audio data. In addition, since the central frequency of a carrier of the FM modulation of the ATIP code is previously set to be 22.05 KHz as described above, said detected tracking error signal can be used for detecting a linear velocity of the rotation of the disc.

Herein, in the above-described intermittent recording or reproduction, a head for recording or a pick-up for reproduction should always follow the end of a track on or from which recording or reproduction has been done immediately before, during the above-described stand-by period of 4T/5, for subsequent recording or reproduction. Thus, by repeatedly jumping the head or the pick-up back to a previous address every time the pick-up reproduces the ATIP code of the end of the track on/from which recording or reproduction is done immediately before, the head or the pick-up is held near the end of the recording track at all times to record or reproduce compressed audio data at a start of subsequent recording or reproduction. In this way, intermittent data recording forms a single continuous recording track in a spiral manner while data is intermittently reproduced from the continuous spiral recording track.

With reference to FIG. 1, a specific structure and operation of a recording/reproducing apparatus for such a small size disc will be described. With reference to FIG. 1, a recording/reproduction switch 28 is switched to a contact R at the time of recording. An analog audio signal supplied from an external audio signal source (not shown) is applied to an input buffer memory 11 after being converted into a digital audio signal by an A/D converting circuit 10, or a digital audio signal supplied from an external audio signal source (not shown) is applied directly to the input buffer memory 11.

The output data of the input buffer memory 11 is compressed into 1/5 by a data compressing circuit 12 and stored in a compressed data storing memory 13. The compressed data stored in the memory 13 is intermittently read for every predetermined number of frames, supplied to a CD-ROM encoder 14 through the recording/reproduction switch 28 and converted into a CD-ROM code. The output of the CD-ROM encoder 14 is applied to a CD-DA encoder 15 wherein the output is supplied with a sub-code and converted into a recording signal of a CD format. The recording signal of the CD format is supplied to a magnetic head drive circuit 16.

Meanwhile, with a magnetic layer of a disc D being heated by a laser beam (not shown) directed from a pick-up 5 to the rear side of the disc D, a magnetic head 6 driven by the magnetic head driving circuit 16 magnetizes the magnetic layer in a guide groove, so that a track is intermittently formed for every fixed unit of compressed digital audio data based on the above-described magneto-optical recording principle, thereby forming one continuous recording track in a spiral manner as a whole in the guide groove.

In reproduction, the recording/reproduction switch 28 is switched to a contact P side. Then, the compressed digital audio data is intermittently reproduced from the recording track of the disc D by the pick-up 5 based on the magneto-optical reproduction principle, amplified by a head amplifier 4 and then again amplified by an RF amplifier 9. After being subjected to predetermined processings such as error correction by a CD-DA recorder 17 and a CD-ROM decoder 18, the output of the RF amplifier 9 is intermittently supplied to and stored in the compressed data storing memory 13 through the recording/reproduction switch 28. The compressed data stored in the memory 13 is continuously read and applied to a data expanding circuit 19 wherein the data is expanded to be five times, which is applied to an output buffer memory 20. The output of the output buffer memory 20 is externally output as a reproduced digital audio signal, while the output is also applied to a D/A converting circuit 21 wherein the output is converted into a reproduced analog signal to be externally output.

In response to a reference signal of 22.05 KHz obtained by frequency-dividing a fixed oscillating output of an oscillator (not shown) in the CD-DA decoder 17 and a reproduced FM modulated signal corresponding to the above-described ATIP code and detected by an ATIP decoder 3 from the output of the head amplifier 4, a disc servo circuit 2 generates a servo control output and supplies the output to a disc motor 1 such that an average carrier frequency of the reproduced FM modulated signal coincides with the frequency 22.05 Hz of the reference signal. As a result, a linear velocity of the rotation of the disc D is constantly maintained in recording and reproduction.

A pick-up control circuit 7 performs tracking control and focusing control of the pick-up 5 based on the output of the head amplifier 4. In addition, the pick-up control circuit 7 generates a plurality of track jump pulses in synchronization with a track jump instruction signal supplied from a system control circuit 29 and supplies the same to the pick-up 5, and the circuit 7 also charges a light intensity of the laser beam emitted from the pick-up 5 in response to a recording start timing pulse supplied from the system control circuit 29.

A sub-code generation circuit 8 estimates a ATIP code corresponding to a subsequent frame based on the ATIP code detected by the ATIP decoder 3 to form a sub-code corresponding to the estimated code and supplies the same to the CD-DA encoder 15.

FIG. 2 is a block diagram showing the system control circuit 29 of FIG. 1 in detail. First in recording, the system control circuit 29 compares a write address and a read address of the compressed data storing memory 13 by using an address comparing circuit 22, thereby detecting the amount of the storage data in the compressed data storing memory 13. When it is detected that the storage data amount of the memory 13 exceeds a fixed amount, a recording instruction circuit 23 generates a recording instruction signal and applies the same to a recording timing pulse generation circuit 24 and a stand-by position change circuit 26.

The stand-by position change circuit 26 receives the recording instruction signal to designate a subsequent stand-by position of the pick-up 5, that is, a position of the end of the recording track. According to the change of the stand-by position of the pick-up 5, a track jump instruction circuit 27 generates a track jump instruction signal including a plurality of pulses and applies the same to the pick-up control circuit 7 at a time point when the ATIP code detected by the ATIP decoder 3 coincides with the stand-by position of the pick-up 5. When the ATIP code does not coincide with the stand-by position, the track jump instruction circuit 27 stops generating a track jump instruction signal and carries out continuous recording of data up to a subsequent stand-by position.

The recording timing pulse generation circuit 24 receives a synchronization detection output of the ATIP code by the ATIP decoder 3 to generate a recording timing pulse and applies the same to the pick-up control circuit 7. In recording stand-by state, therefore, a track jump pulses are supplied from the pick-up control circuit 7 to the pick-up 5 in response to a track jump instruction signal to control the pick-up 5 to continue to follow a frame of the end of the recording track. After generation of a recording instruction signal, however, a stand-by position has been changed, so that no track jump instruction signal is generated and continuous recording of data is performed.

The recording timing pulse is supplied to the compressed data storing memory 13, the magnetic head drive circuit 16 and the pick-up control circuit 7, thereby starting intermittent read of the compressed data from the memory 13, driving the magnetic head drive circuit 16 and changing the light intensity of the laser beam of the pick-up 5 to a high level. Each of the beginning and the end of the recording track has link frames without including audio data additionally recorded thereon to form seams in the recording track.

If reproduction, the system control circuit 29 compares a write address with a read address of the compressed data storing memory 13 by using the address comparing circuit 22 to detect the storage data amount in the memory 13. A reproduction instruction circuit 25 generates a reproduction instruction signal and applies the same to the pick-up control circuit 7 and the stand-by position change circuit 26 when detection is made that the storage data amount in the memory 13 is equal to or less than a fixed amount.

On receiving reproduction instruction signal, the stand-by position change circuit 26 designates a subsequent stand-by position of the pick-up 5, that is, the position of the end of the reproduction track. According to the change of the stand-by position of the pick-up 5, the track jump instruction circuit 27 generates a track jump instruction signal including a plurality of pulses and applies the same to the pick-up control circuit 7 when the ATIP code detected by the ATIP decoder 3 coincides with the stand-by position of the pick-up 5. When the ATIP code does not coincide with the stand-by position, the track jump instruction circuit 27 stops generating a track jump instruction signal and data is continuously reproduced up to a subsequent stand-by position of the pick-up 5.

In a stand-by state, the pick-up control circuit 7 supplies a track jump pulse to the pick up 5 to control the same to continue to follow the frame of the end of the reproduction track in response to the track jump instruction signal. After a recording instruction signal is generated, however, no track jump instruction signal is generated since the stand-by position has been changed and data will be continuously reproduced until the pick-up reaches the changed stand-by position.

Figure 3:
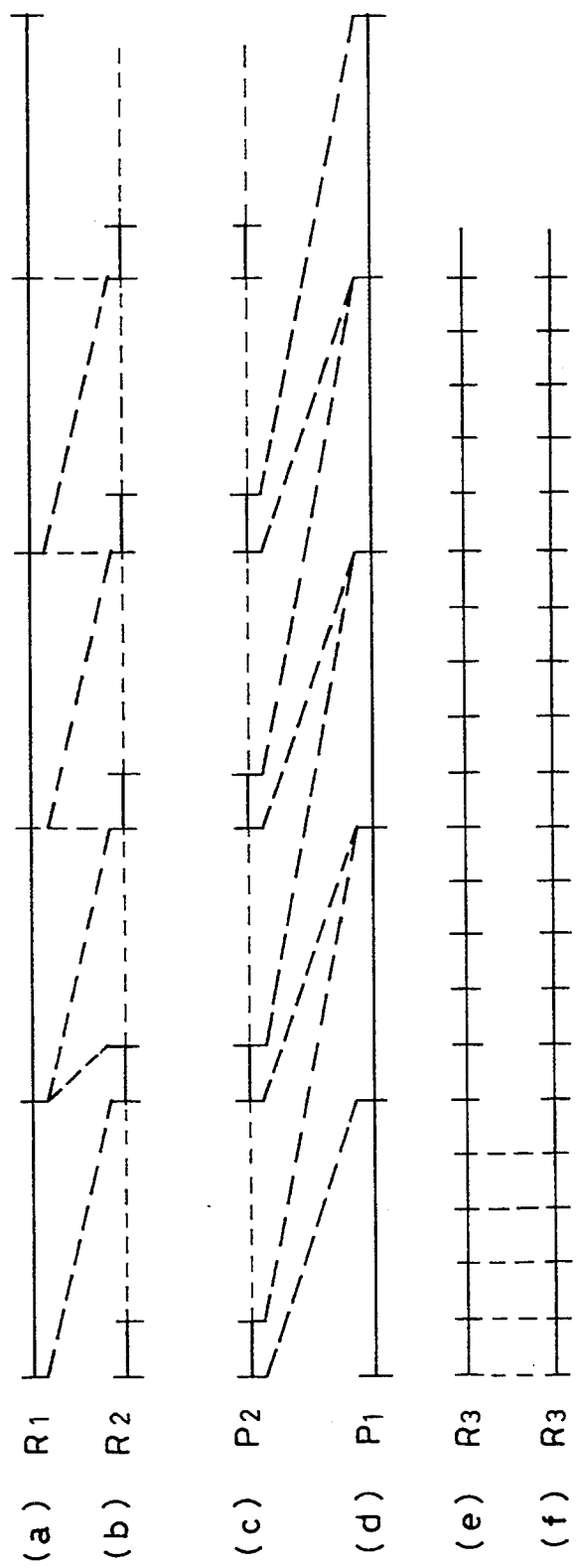
FIG. 3 is a timing chart illustrating the principle of high-speed dubbing according to the present invention.

FIG. 3 is a timing chart showing a relationship in time between the above-described principle of intermittent recording/reproduction and the principle of high-speed dubbing according to the present invention.

As described in the foregoing, for intermittently recording, a recording audio signal R1 (FIG. 3(a)) in period T (for example, 2 seconds) is digitized by the A/D converting circuit 10 and the data of the digitized signal is compressed into 1/5 by the data compression circuit 12. The compressed data R2 (FIG. 3(b)) in T/5 period (0.4 second) is read from the memory 13 during T/5 period and intermittently recorded on a track of the disc D.

For intermittent reproduction, the compressed data is reproduced from the disc during T/5 period. The reproduced compressed data P2 (FIG. 3(c)) is stored in the memory 13 and sequentially read. The read data is expanded by the data expansion circuit 19 and converted into a reproduced audio signal P1 (FIG. 3(d)) of the original period T.

Continuous reproduction of the disc on which the compressed audio data is intermittently recorded as shown in FIG. 3(b), results in continuous output of the compressed audio data from the disc. That is, the continuously reproduced compressed data R3 (FIG. 3(e)) has its data compressed into 1/5, while rotating a disc at the same linear velocity as that for normal intermittent reproduction. Continuous recording of the compressed data on another disc results in recording of continuous recording compressed data R3 (FIG. 3 (f)) performed at a speed five times that of a normal intermittent recording, while rotating the disc at the same linear velocity. The present invention employs such recording/reproduction principle to enable digital high-speed dubbing, while rotating a disc at the same rotation speed as that in a normal intermittent recording/reproduction.

Figure 4:
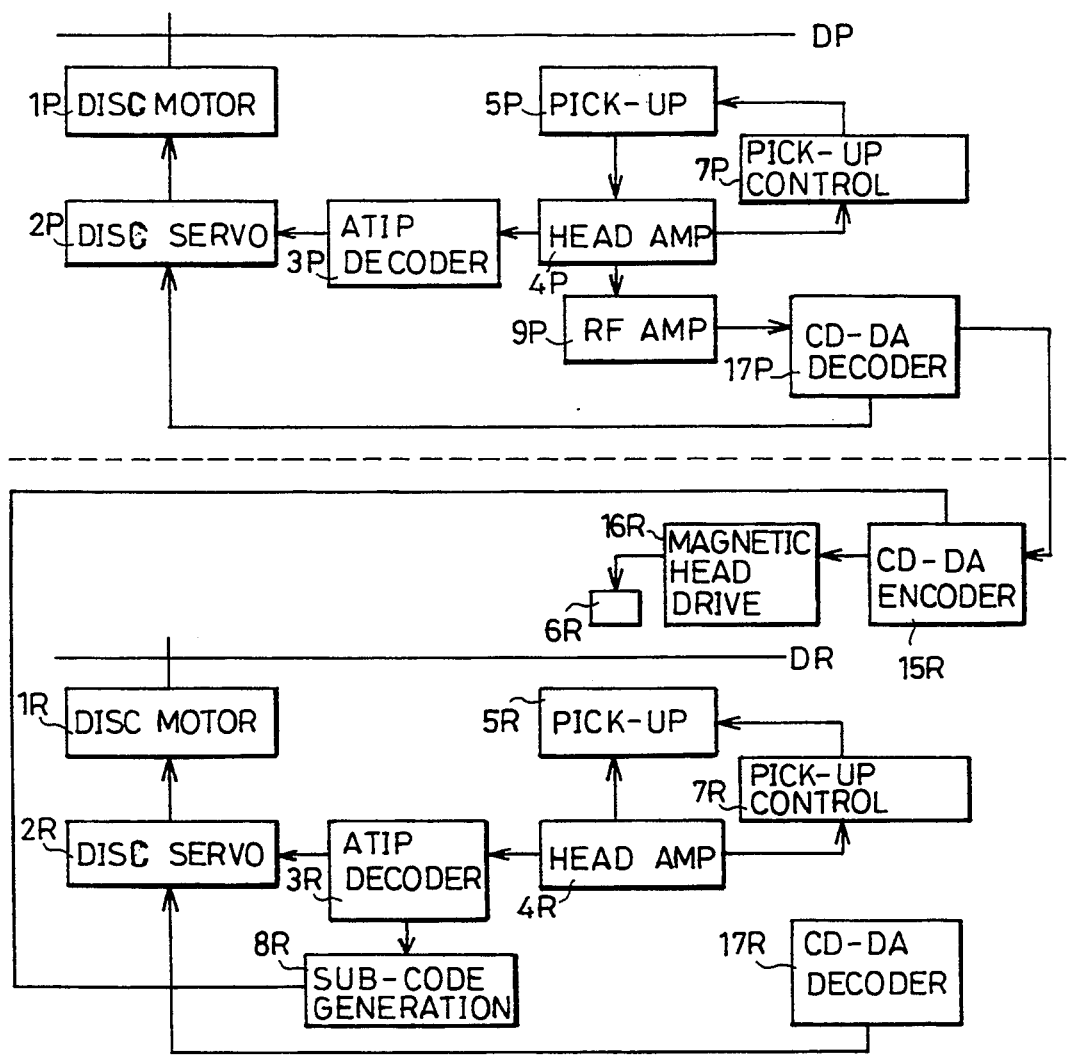
FIG. 4 is a block diagram showing a high-speed dubbing system according to one embodiment of the present invention.

FIG. 4 is a block diagram showing a high-speed dubbing system employing such principle according to one embodiment of the present invention. The embodiment shown in FIG. 4 employs two recording/reproducing apparatuses for the above-described small size disc to perform high speed dubbing of digital audio data from one small size disc to the other. With respect to the broken line at the center of the figure, the upper half shows the main part of a first recording/reproducing apparatus functioning as a reproducing device and the lower half shows a main part of a second recording/reproducing apparatus functioning as a recording device.

First, a disc servo circuit 2P receives a reference signal obtained by frequency-dividing a fixed oscillating output of an oscillator (not shown) contained in a DC-DA decoder 17P in the recording/reproducing apparatus at a reproduction side, and an FM modulated signal obtained from an ATIP decoder 3P. Then, the disc servo circuit 2P controls rotation of a disc motor 1P to maintain a linear velocity of a reproduction disc DP constant at all times. A pick-up control circuit 7P generates a focusing a control signal and a tracking control signal and supplies the same to a pick-up 5P in response to the output of a head amplifier 4P. The pick-up 5P closely follows the recording track in response to these signals. Such servo operation concerning the disc is also the case with the device for recording shown below the dotted line of FIG. 4, for which no description will be made. A pick-up 5R at the recording side has its laser beam intensity set to be stronger than that of the pick-up on the reproduction side.

In the embodiment shown in FIG. 4, both the pick-up 5P on reproduction side and the pick-up 5R on the recording side perform continuous track scanning without track jump as is performed in a normal intermittent recording/reproducing operation. As a result, the output continuously generated from the reproduction side head amplifier 4P is amplified by a reproduction side RF amplifier 9P and applied to the CD-DA decoder 17P. The CD-DA decoder 17P subjects the continuously reproduced signal to a predetermined processing such as error correction to output a continuously reproduced signal of a CD-ROM format.

Meanwhile in the apparatus for recording, the continuously reproduced signal supplied from the CD-DA decoder 17P on the reproduction side is directly applied to a CD-DA encoder 15R. The CD-DA encoder 15R applies a sub-code generated by a recording side sub-code generation circuit 8R to the continuously reproduced signal to again form a continuous signal of a CD format, which signal is supplied to a magnetic head drive circuit 16R. In a recording state, the magnetic head drive circuit 16R supplies a continuous drive output to a magnetic head 6R to carry out a continuous magneto-optical recording on a recording disc DR.

Although the above-described embodiment of FIG. 4 is structured to carry out high-speed dubbing by using the output of the reproduction side CD-DA decoder 17P, it can be structured to perform high-speed dubbing by using the output of a CD-ROM decoder. Such high-speed dubbing enables error correction of digital audio data with higher precision.

The foregoing embodiment is described without describing operation of the system control circuit 29 in high-speed dubbing. It is only necessary to prevent generation of a track jump instruction signal in high-speed dubbing but not to provide additional mechanism and circuit.

According to the above-described embodiment, the disc is rotated in reproducing for dubbing at the fixed linear velocity same as that in recording. However, such fixed linear velocity in reproducing can be increased up to twice as fast as that in recording if the apparatus can follow such high speed rotation of the disc.

As described in the foregoing, according to the embodiment of the present invention, continuously reproduced output of the compressed digital audio data from a disc on a reproduction side is directly applied to a recording side apparatus and continuously recorded on a recording discs, which enables high-speed digital dubbing with a rotation speed of both discs maintained the same as those of a normal intermittent recording/reproducing operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical reproducing apparatus comprising:

disc rotating means for rotating a disc at a fixed linear velocity, said disc contains a single continuous spiral recording track wherein said track contains compressed digital audio data obtained by compressing audio data such that a reduced data amount is recorded on said track with a time base of said audio data being compressed intermittent reproducing means for intermittently reproducing said compressed digital audio data from said recording track of said disc rotated by said disc rotating means at said fixed linear velocity, memory means, connected to said reproducing means, for storing said compressed digital audio data reproduced by said intermittent reproducing means, data expanding means, connected to said memory means, for expanding said compressed digital audio data stored in said memory means to form first reproduced audio data, and continuous reproducing means for continuously reproducing said compressed digital audio data from said recording track of said disc rotated by said disc rotating means at said fixed linear velocity to continuously output the compressed digital audio data as second reproduced audio data.

2. A magneto-optical recording apparatus comprising:

disc rotating means for rotating a disc at a fixed linear velocity, data compressing means for compressing a first digital audio data, memory means, connected to said data compressing means, for sequentially storing said compressed digital audio data, intermittent recording means, connected to said memory means, for intermittently reading said compressed digital audio data stored in said memory means and intermittently recording said compressed digital audio data on said disc rotated by said rotating means at said fixed linear velocity to form a single continuous spiral recording track upon said disc, and continuous recording means for continuously recording second compressed digital audio data continuously supplied from a source of compressed digital audio data in place of said first digital audio data on said disc rotated by said disc rotating means at said fixed linear velocity to form a single continuous spiral recording track upon said disc.

3. A magneto-optical recording/reproducing apparatus comprising:

disc rotating means for rotating a disc at a fixed linear velocity during both data recording and reproduction, data compressing means for compressing first digital audio data during recording, intermittent recording means for intermittently recording said compressed digital audio data on said disc rotated by said rotating means at said fixed linear velocity to form a single continuous spiral recording track upon said disc, continuous recording means for continuously recording second compressed digital audio data, continuously supplied from a source of compressed digital audio data in place of said first digital audio data, on said disc rotated by said disc rotating means at said fixed linear velocity to form a single continuous spiral recording track upon said disc, intermittent reproducing means for intermittently reproducing said compressed digital audio data from the single continuous spiral recording track formed on said disc rotated by said disc rotating means at said fixed linear velocity, data expanding means, connected to said intermittent reproducing means, for expanding said compressed digital audio data to form first reproduced audio data, and continuous reproducing means for continuously reproducing said compressed digital audio data from the single continuous spiral recording track formed on said disc rotated by said disc rotating means at said fixed linear velocity to continuously output the compressed digital audio data as second reproduced audio data.

* * * * *